United States Patent [19]

Correnti

[11] Patent Number: 5,252,083

[45] Date of Patent: Oct. 12, 1993

[54] ELECTRICAL OUTLET SAFETY COVER

[76] Inventor: Giuseppe A. Correnti, 4 River St., Apt. 33, Little Ferry, N.J. 07643

[21] Appl. No.: 906,488

[22] Filed: Jun. 30, 1992

Related U.S. Application Data

[63] Continuation-in-part of Ser. No. 769,407, Oct. 1, 1991, abandoned.

[51] Int. Cl.⁵ ............................................. H01R 13/44
[52] U.S. Cl. ..................................... 439/147; 174/67; 439/367
[58] Field of Search ............... 439/147, 367, 373, 892, 439/893; 174/67

[56] References Cited

U.S. PATENT DOCUMENTS

| | | | |
|---|---|---|---|
| 4,530,555 | 7/1985 | South | 439/147 |
| 4,915,638 | 4/1990 | Domian | 439/367 |
| 5,087,796 | 2/1992 | Norman | 439/147 |

*Primary Examiner*—Paula A. Bradley
*Attorney, Agent, or Firm*—Donald R. Heiner

[57] ABSTRACT

An electrical wall plug outlet enclosure and safety device wherein a face plate is detachably mounted to the wall over the electrical wall plug outlet and in turn generally rectangular but tapered cover is detachably mounted to the face plate to prevent touching of the prongs of an inserted electrical plug and to prevent the insertion of an object, especially a metal object, into the electrical outlet when a plug is not inserted. The cover further has openings at opposite ends for passage of an electrical cord or cords attached at one end to an electrical plug and at its other end to an electrical appliance. The face plate has flexible wings or tabs extending horizontally outwardly from the approximate mid-portion of the face plate for engagement with longitudinally extending slots or openings formed on opposite sides of the cover to detachably secure the cover to the face plate. To detach or uncouple the cover from the face plate a flat metal object, such as the blade of a small screw driver, is inserted into one of the slots and pressed against one of the wings or tabs to release the engagement and allow the cover to be removed from the face plate thereby exposing the electrical plug outlet. Protective stops are disposed inside the rectangular cover adjacent the slots to prevent the flat metal object from contacting the electrical plug prongs to prevent shock 5 Claims, 3 Drawing Sheets

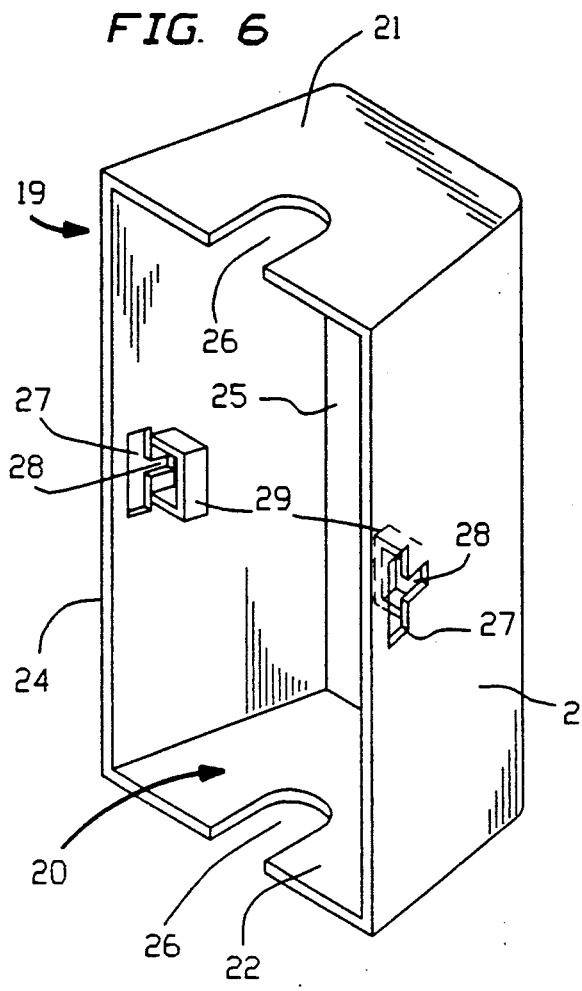
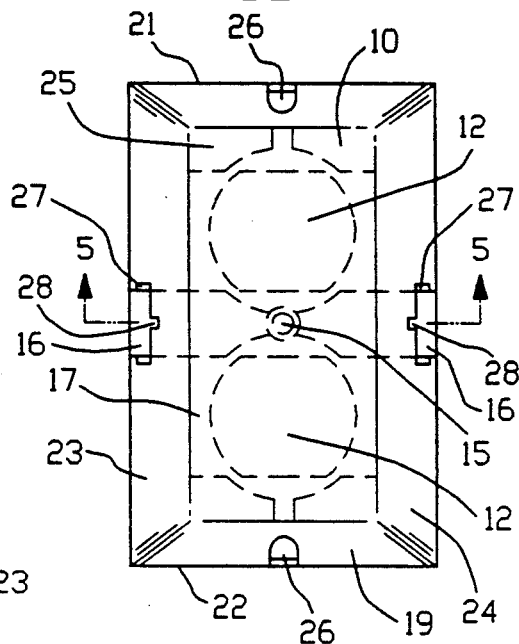
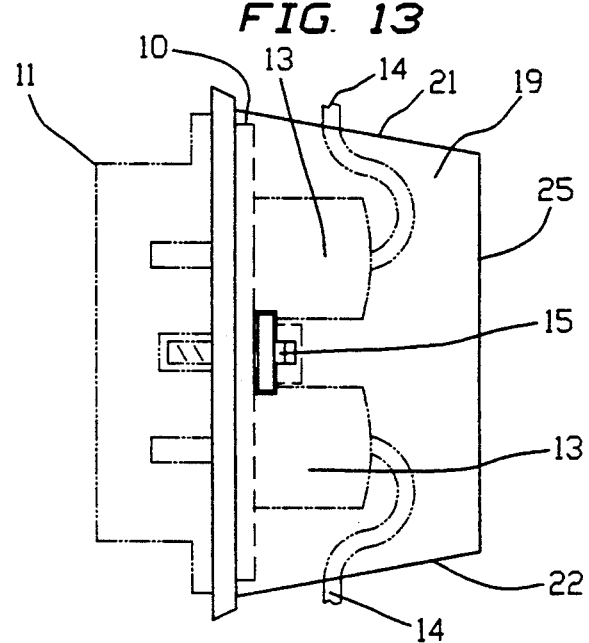

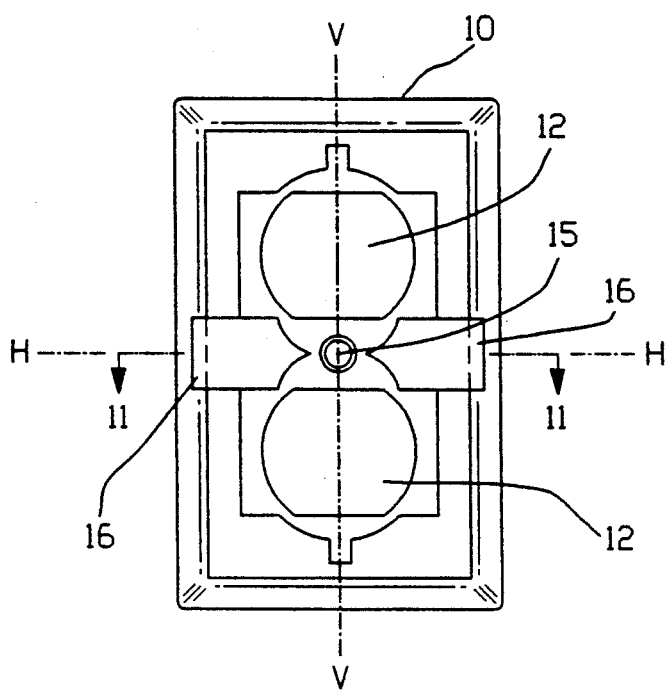
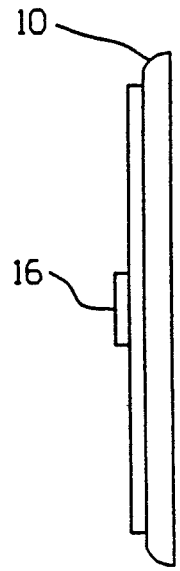
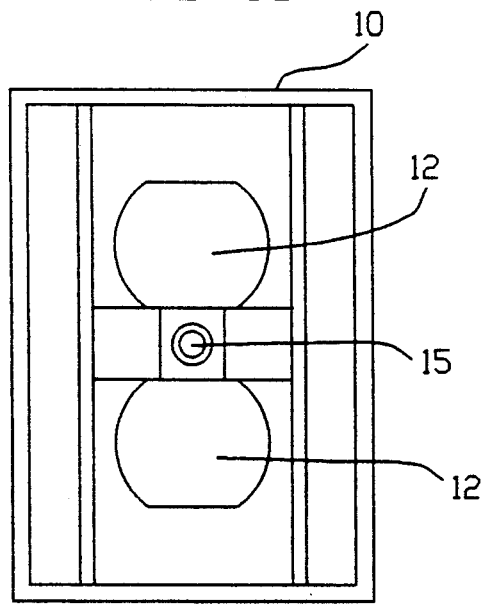
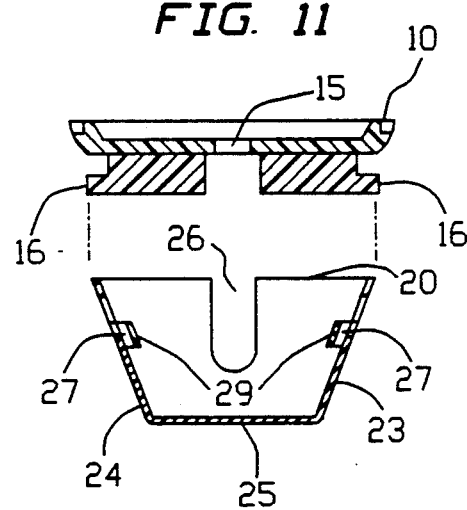
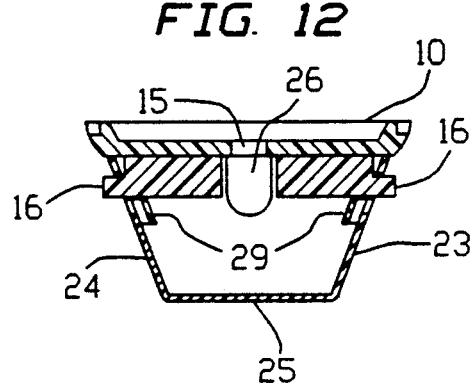

ELECTRICAL OUTLET SAFETY COVER

CROSS REFERENCE TO RELATED APPLICATIONS

This application is a continuation in part of patent application Ser. No. 07/769,407 filed Oct. 1, 1991 now abandoned.

BACKGROUND OF INVENTION

1. Field of the Invention

The present invention generally involves the field of technology pertaining to devices for covering an electrical wall outlet receptacle and more specifically, the invention relates to a combination of a face plate detachably mounted to a wall and over the electrical receptacle and a cover or box-like structure detachably connected to the face plate by means of tabs or wings on the face plate engaging slots formed in the cover or box. The cover or box-like structure is essentially of rectangular shape with one open end which engages the face plate. The end or side of the cover opposite the open end is closed and the cover tapers from the open end to the closed end making it difficult for any one, especially a child, to grasp and pull on the box in an attempt to disengage it from the face plate.

Openings are provided in the cover or box through which electrical cords pass when an electrical appliance is plugged into the electrical outlet and the cover is pressed over the face plate.

Electrical wall outlets present several significant dangers to children and adults alike. Electrical cords tend to become worn or frayed where they enter an electrical plug; an electrical plug may become partially disengaged from an outlet thereby exposing the prongs of the plug; or, if no appliance is plugged into the electrical outlet, there is the danger of someone, especially a child, inserting a metal object into the outlet and receiving a shock.

Therefore, a need exists for a safety device which prevents against these dangers.

2. Description of the Prior Act

In applicant's co-pending application the examiner has cited the following references as examples of other devices which provide protection against the inherent dangers of electrical wall outlets; Heverly U.S. Pat. No. 4,603,932, South U.S. Pat. No. 4,530,555, G. M. Pruonto et al. U.S. Pat. No. 3,335,390, Heverly U.S. Pat. No. 4,531,794, Brown et al. U.S. Pat. No. 4,895,527, Chrones U.S. Pat. No. 4,070,078, Menninga U.S. Pat. No. 4,950,842, Domian U.S. Pat. No. 4,915,638, and, Riceman U.S. Pat. No. 4,899,019.

The South U.S. Pat. No. 4,530,555 depends for its operation on a complicated mounting bracket having a pin and spring combination for securing a cover over the electrical outlet.

The G. M. Pruonto et al. U.S. Pat. No. 3,335,390 depends upon a center bar provided with integral curved hooks, disposed behind a face plate, for attaching a shield to the face plate.

The Heverly U.S. Pat. No. 4,531,794 comprises both a base member of a generally rectangular shaped box-like structure and a cooperating cover which is also of a generally rectangular box-like structure which interlock with each other through a series of studs and latching elements disposed on the inside of the base member and cover member.

Heverly U.S. Pat. No. 4,603,932 requires protruding tabs on the outside of a box-like structure which cooperate with cutouts formed in a frame to form the two pieces when the box-like structure slips within the frame.

The Brown et al. U.S. Pat. No. 4,895,527 discloses a cover which tapers from top to bottom and which has two apertures extending therethrough for passage of electrical plugs. One of the apertures is vertically aligned while the other directly aligns with a second receptacle outlet. The cover is fastened or attached to a face plate by fastening means such as an elongate screw.

Chrones U.S. Pat. No. 4,070,078 is significantly different from the device disclosed herein in that it requires a pair of hollow closure elements hingedly connected to a plate mounted over the electrical outlet. The plate further has a pair of integral latching elements which in turn have retaining or latching surfaces for forming part of a slot or groove.

The Menninga U.S. Pat. No. 4,950,842 comprises a face plate and box-like cover combination having complementary locking members formed on the inside of each which requires a magnetic force, provided from the outside, to release the engagement of the cover from the face plate. A horizontal cam bar and transverse stop bar are provided on the rectangular base plate for proper operation of the device.

The Domian U.S. Pat. No. 4,915,638 requires a box-like cover hinged to a base plate wherein a latching mechanism, including a cantilevered locking tab, secures the cover to the base plate in the closed position.

Riceman U.S. Pat. No. 4,899,019 discloses a safety cover for electrical receptacles consisting of a receiving plate and housing member hingedly connected. A plurality of locking flanges extend from the cover assembly to the face plate and the face plate, in turn, has locking flange receiving means whereby the cover assembly and face plate are interlocked. Each locking flange must be simultaneously depressed such that the flanges move out of the receiving means for unlocking the device.

SUMMARY OF THE INVENTION

According to the present invention a face plate having one or more openings therethrough for receiving a standard electrical plug is attached by any well known means, such as a screw or other fastening device, to a wall mounted electrical plug receptacle. The face plate has one or more tabs or wings extending outwardly horizontally from its vertical axis. In one embodiment the tabs or wings extend outwardly from the approximate center or mid point of the face plate to the outer vertical edges of the face plate. In another embodiment the tabs or wings extend outwardly a distance greater than the diameter of the electrical plug receiving openings but a distance less than the vertical edges of the face plate. In either of the two foregoing embodiments the tabs or wings may be formed integral with the face plate or they may be formed on a separate mounting plate which in turn is attached to the face plate by any well known fastening device.

A cover is provided to be detachably mounted to the face plate by means of "T" shaped elongated slots formed through two sides of the cover engaging the tabs or wings of the face plate in an interlocking relationship. The cover is of box-like generally rectangular shape or perhaps better described as a truncated pyramid but with a rectangular rather than a square shaped base. Disposed inside the cover, adjacent the "T" shaped slots, are stops to prevent a flat metal object, such as the blade of a screw driver, from contacting the electrical plug prongs. Such a metal object is inserted into the small slot forming the cross of the "T", for pressing on the tab to release the cover from the face plate.

The cover is further provided with openings to allow passage of electrical cords connected at one end to an electrical plug and at the other end to an electrical appliance.

The taper of the cover makes it extremely difficult to grasp and pull apart from the face plate thus making it necessary to disengage the tabs from the slots by means of a small metal or other objects inserted into the slots to disconnect the cover from the face plate.

It is therefore an object of the present invention to provide a protective cover for an electrical wall outlet.

It is another object of the invention to provide an improved protective cover for an electrical wall outlet having a protective cover engaging a face plate which in turn is mounted on an electrical plug receptacle.

It is a further object of the invention to provide an improved protective cover for an electrical wall outlet wherein a face plate has horizontally extending tabs for engagement with longitudinal "T" shaped slots formed in a cover member.

It is yet another object of the invention to provide an improved protective cover for an electrical wall outlet wherein the cover member is a truncated pyramid but with a rectangular rather than a square shaped base making it difficult to grasp and pull apart from a face plate.

These and other objects, features and advantages of the invention shall become apparent from the following detailed description of a preferred embodiment thereof when taken in conjunction with the drawings wherein like reference characters refer to corresponding parts in the several views.

BRIEF DESCRIPTION OF THE DRAWINGS

FIG. 6 is a pictorial view of the cover of the invention.

FIG. 7 is a front assembled view of the face plate and cover.

FIG. 8 is a front view of a second embodiment of the face plate.

FIG. 9 is a right end view of the face plate of FIG. 8.

FIG. 10 is a rear view of the face plate of FIG. 8.

FIG. 11 is an exploded sectional view taken on line 11 of FIG. 8 and a sectional view taken on line 5—5 of FIG. 7.

FIG. 12 is a cross sectional assembled view, taken on line 5—5 of FIG. 7, similar to FIG. 5, but with the face plate shown in FIG. 8.

FIG. 13 is a side view, assembled, showing the face plate, electrical outlet, electrical plugs, and cover of the instant invention.

DETAILED DESCRIPTION OF THE PREFERRED EMBODIMENT

An electrical wall plug outlet enclosure and safety device according to a preferred embodiment of the invention will now be described with initial reference to FIGS. 1-7 of the drawings.

Figure 1:
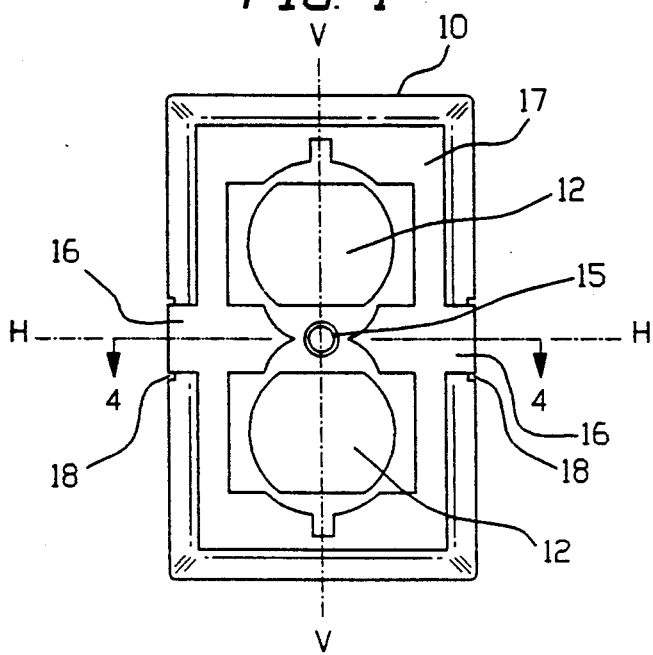
FIG. 1 is a front view of the face plate of the invention showing the tabs, openings for receiving an electrical plug, and opening for receiving a fastener for attaching the face plate to an electrical wall plug receptacle not shown.
Figure 2:
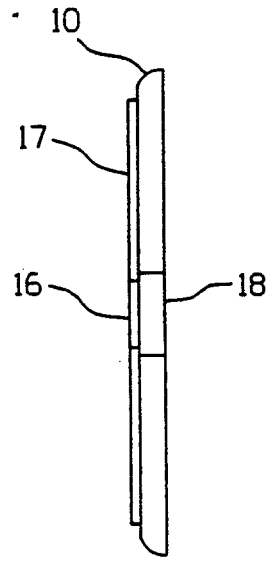
FIG. 2 is an end view of the face plate of FIG. 1 looking into the right end.
Figure 3:
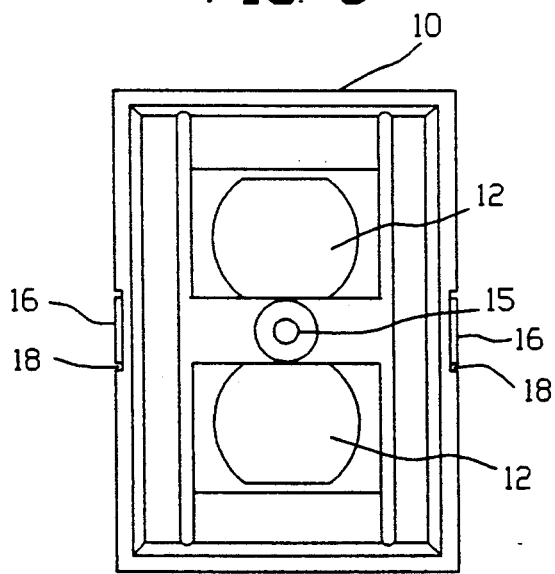
FIG. 3 is a rear view of the face plate of FIG. 1.
Figure 4:
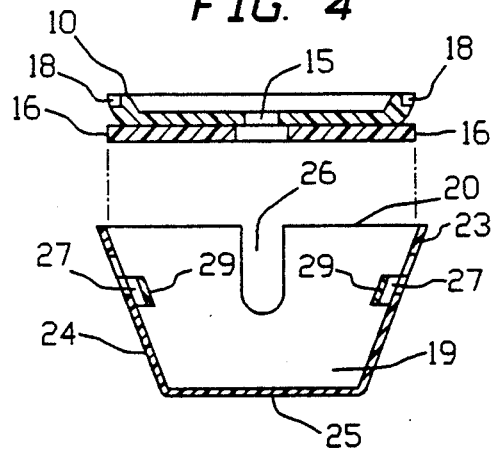
FIG. 4 is an exploded sectional view taken on line 4—4 of FIG. 1 and a sectional view taked on line 5—5 of FIG. 7.
Figure 5:
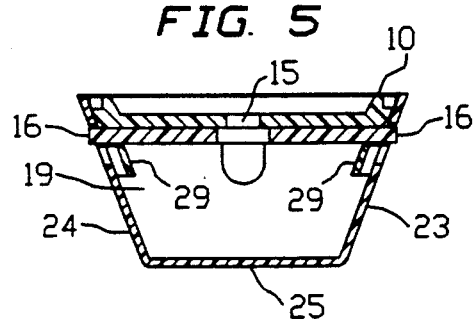
FIG. 5 is a cross sectional assembled view, taked on line 5—5 of FIG. 7, similar to FIG. 4, but assembled rather than exploded.

A face plate 10 for mounting on to an electrical wall plug outlet, shown generally as 11 in FIG. 13, has a vertical axis V—V and horizontal axis H—H as shown in FIG. 1. Electrical plug receiving openings 12 are formed through face plate 10 for receiving an electrical plug 13, shown in FIG. 13. An electrical cord 14 is attached at one end to electrical plug 13 and at its other end to an electrical appliance, not shown. A fastener 15, such as a screw, is located at the approximate mid-point of face plate 10 for securing face late 10 to the electrical wall plug outlet 11. Tabs 16 are formed integral with a mounting plate 17 which plate in turn is mounted on to face plate 10 in any well known manner. The tabs 16 may also be formed integral with the face plate 10 as seen in FIG. 8. These tabs 16 extend horizontally outwardly from the approximate mid-point of face plate 10, from its vertical axis V—V as best seen in FIGS. 1 and 8. In the preferred embodiment of the invention as seen in FIG. 1, the tabs 16 extend horizontally outwardly from the vertical axis V—V a distance at least equal to the width of the face plate 10. Notches 18 are formed in both vertical sides of face plate 10 as best seen in FIGS. 1 and 3 and the tabs 16 extend over these notches 18 which allows the tabs to extend into slots formed in a protective cover as will be more fully described below.

In a second embodiment of the invention, as seen in FIG. 8, the tabs 16 extend horizontally outwardly from the approximate mid-point of face plate 10, from its vertical axis V—V, a distance greater than the diameter of the plug receiving openings 12 but less than the width of face plate 10.

A generally rectangular shaped box-like cover 19 is shown in FIGS. 6 and 13 and in cross section in FIGS. 4, 5, 11 and 12. This box-like cover is a truncated pyramid with a rectangular base or open end 20 and four adjacent sides 21, 22, 23 and 24 which taper toward the side 25 opposite the open end 20. Openings 26 are formed in sides 21 and 22 for receiving electrical cords 14 as best seen in FIG. 13.

A longitudinal slot 27 is formed in each of sides 23 and 24 for receiving tabs 16 of face plate 10 when box-like cover 19 is positioned with its open end 20 over face plate 10, slots 27 aligned over tabs 16, and the box-like cover is pressed against face plate 10. By reason of the tabs engaging the longitudinal slots the box-like cover is securely fastened to the face plate to protect against the electrical hazards previously discussed.

Adjacent to longitudinal slots 27, and intersecting them to form a T shape, are horizontal slots 28. When a flat metal object, such as the blade of a small screw driver, is inserted into slot 28 and pressed against tabs 16 the box-like cover is disengaged from the face plate 10 thereby exposing the electrical wall plug outlet.

Stops 29, as seen in FIG. 6, are disposed on the inside of sides 23 and 24 adjacent the horizontal slots 28 to prevent the flat metal object from contacting a prong of the electrical plug when the object is inserted for the purpose of disengaging the box-like cover from the face plate.

It is readily seen that the flexible-tabs may extend vertically from the horizontal axis of the face plate and the longitudinal slots of the box-like cover may be formed in the sides opposite to those shown in the drawings and that electrical plug receiving openings may be formed in the sides opposite to those shown in the drawings.

Though the invention has been described and illustrated with reference to a preferred embodiment thereof, those skilled in the art will appreciate that various changes and modifications in shape, size, composition and arrangement of parts may be resorted to without departing from the spirit of the invention or scope of the subjoined claims.

What is claimed is:

1. A electrical wall plug outlet enclosure and safety device comprising:
    (a) a face plate having at least one electrical plug receiving opening detachably mounted to an electrical wall plug outlet for detachably receiving a box-like cover;
    (b) a plurality of tabs attached to said face plate at its approximate mid-point and extending horizontally outwardly from its vertical axis wherein said tabs are formed integral with said face plate;
    (c) a generally rectangular shaped box-like cover having one open end for positioning over said face plate; and
    (d) a longitudinal slot formed in each of two sides of said box-like cover, the two sides being adjacent said open end, whereby when said box-like cover is positioned over and pressed against said face plate said tabs engage said longitudinal slots holding said box-like cover in locking engagement with said face plate.

2. A electrical wall plug outlet enclosure and safety device comprising:
    (a) a face plate having at least one electrical plug receiving opening detachably mounted to an electrical wall plug outlet for detachably receiving a box-like cover;
    (b) a plurality of tabs attached to said face plate at its approximate mid-point and extending horizontally outwardly from its vertical axis a distance greater than the diameter of said plug receiving opening but less than the width of said face plate;
    (c) a generally rectangular shaped box-like cover having one open end for positioning over said face plate; and
    (d) a longitudinal slot formed in each of two sides of said box-like cover, the two sides being adjacent said open end, whereby when said box-like cover is positioned over and pressed against said face plate said tabs engage said longitudinal slots holding said box-like cover in locking engagement with said face plate.

3. A electrical wall plug outlet enclosure and safety device comprising:
    (a) a face plate having at least one electrical plug receiving opening detachably mounted to an electrical wall plug outlet for detachably receiving a box-like cover;
    (b) a plurality of tabs attached to said face plate at its approximate mid-point and extending horizontally outwardly from its vertical axis;
    (c) a generally rectangular shaped box-like cover having one open end for positioning over said face plate wherein said box-like cover is a truncated pyramid wherein the open end is rectangular and the four sides adjacent the open end taper toward the side opposite the open end; and
    (d) a longitudinal slot formed in each of two sides of said box-like cover, the two sides being adjacent said open end, whereby when said box-like cover is positioned over and pressed against said face plate said tabs engage said longitudinal slots holding said box-like cover in locking engagement with said face plate and wherein said longitudinal slots intersect horizontal slots to form a T shape slot whereby when a flat object is inserted into the small leg of said T shaped slot and pressed against said tabs said box-like cover is disengaged from said face plate thereby exposing said electrical wall plug outlet.

4. A device as claimed in claim 3 wherein a stop is disposed on the inside of said box-like cover adjacent the horizontal slot of each T shape slot to prevent said flat object from contacting a prong of an electrical plug.

5. A device as claimed in claim 4 wherein at least one side of said box-like cover has an opening for receiving an electrical cord which is attached at one end to an electrical plug and at its other end to an electrical appliance.

* * * * *